US008167981B2

(12) United States Patent
Webb

(10) Patent No.: US 8,167,981 B2
(45) Date of Patent: May 1, 2012

(54) VACUUM FILTER ASSEMBLY

(75) Inventor: Richard Webb, Pittsford, NY (US)

(73) Assignee: SPX Corporation, Charlotte, NC (US)

( * ) Notice: Subject to any disclaimer, the term of this patent is extended or adjusted under 35 U.S.C. 154(b) by 513 days.

(21) Appl. No.: 12/427,545

(22) Filed: Apr. 21, 2009

(65) Prior Publication Data

US 2010/0263536 A1    Oct. 21, 2010

(51) Int. Cl.
*B01D 46/00* (2006.01)
(52) U.S. Cl. ............... 95/282; 55/295; 55/296; 55/297; 55/283; 55/289
(58) Field of Classification Search ............ 55/282–305; 95/282
See application file for complete search history.

(56) References Cited

U.S. PATENT DOCUMENTS

| | | | |
|---|---|---|---|
| 3,057,703 A | 10/1962 | Knapic | |
| 4,359,864 A * | 11/1982 | Bailey | 60/311 |
| 4,643,833 A | 2/1987 | Aulich et al. | |
| 4,857,278 A | 8/1989 | Gevelber et al. | |
| 4,874,407 A * | 10/1989 | Lefkowitz | 96/400 |
| 5,266,280 A * | 11/1993 | Hallett | 422/186.3 |
| 5,372,781 A * | 12/1994 | Hallett et al. | 422/186.3 |
| 5,456,204 A | 10/1995 | Dimitrov et al. | |
| 5,505,912 A * | 4/1996 | Hallett | 422/186.3 |
| 5,531,798 A | 7/1996 | Engstrom et al. | |
| 5,753,014 A | 5/1998 | Van Rijn | |
| 5,857,840 A | 1/1999 | Suda et al. | |
| 5,895,521 A | 4/1999 | Otsuka et al. | |
| 5,922,092 A * | 7/1999 | Taylor | 55/295 |
| 6,120,584 A | 9/2000 | Sakata et al. | |
| 6,146,451 A | 11/2000 | Sakata et al. | |
| 6,287,528 B1 | 9/2001 | Weber | |
| 6,352,578 B1 | 3/2002 | Sakata et al. | |
| 6,365,108 B1 * | 4/2002 | Philyaw | 422/98 |
| 6,514,303 B2 * | 2/2003 | Lukac et al. | 55/289 |
| 6,625,845 B2 * | 9/2003 | Matsumoto et al. | 15/353 |
| 6,723,151 B2 | 4/2004 | Tanaka et al. | |
| 6,905,533 B2 | 6/2005 | Becker et al. | |
| 7,318,848 B2 * | 1/2008 | Lee | 55/283 |
| 7,351,269 B2 * | 4/2008 | Yau | 55/297 |
| 7,381,266 B1 | 6/2008 | Chang | |

(Continued)

FOREIGN PATENT DOCUMENTS

DE    102005022101 A1    5/2006

(Continued)

*Primary Examiner* — Jason M Greene
*Assistant Examiner* — Dung H Bui
(74) *Attorney, Agent, or Firm* — Baker & Hostetler LLP

(57) ABSTRACT

A filter assembly for mechanically removing silicon monoxide during a crystal growth run having a filter housing, a filter mounting plate attached to the filter housing, a sweep plate attached to the filter housing, a plurality of filter elements attached to the filter mounting plate, and a plurality of ring-shaped brushes mounted to the sweep plate, wherein at least one of the plurality of ring-shaped brushes surrounds each of the plurality of filter elements. Alternatively, a filter assembly for mechanically removing silicon monoxide during a crystal growth run having a filter housing having a upper portion, a lower portion and a central portion, a filter mounting plate attached to the filter housing proximate the upper portion, a plurality of filter elements attached to the filter mounting plate, and a cylindrical brush mounted in the center portion of the filter housing, wherein the cylindrical brush has a plurality of bristles pointing radially outward, said bristles contacting an outer portion of the plurality of filter elements.

25 Claims, 6 Drawing Sheets

U.S. PATENT DOCUMENTS

| | | | |
|---|---|---|---|
| 7,419,520 B2 * | 9/2008 | Lee et al. | 55/282 |
| 7,494,520 B2 * | 2/2009 | Nam et al. | 55/289 |
| 7,534,279 B2 * | 5/2009 | Oh et al. | 55/343 |
| 2002/0159935 A1 * | 10/2002 | Jansen | 422/245.1 |
| 2003/0056645 A1 | 3/2003 | Land et al. | |
| 2003/0200867 A1 | 10/2003 | Becker et al. | |
| 2004/0179983 A1 * | 9/2004 | Balan | 422/227 |
| 2006/0042202 A1 * | 3/2006 | Lee et al. | 55/289 |
| 2006/0266011 A1 | 11/2006 | Halbmaier et al. | |
| 2008/0160472 A1 | 7/2008 | Chang | |

FOREIGN PATENT DOCUMENTS

| | | |
|---|---|---|
| EP | 0897738 A1 | 2/1999 |
| EP | 0931579 A1 | 7/1999 |
| EP | 1297882 A1 | 5/2006 |
| JP | 04-297022 A | 10/1992 |
| JP | 05-057136 A | 3/1993 |
| JP | 08-323138 A | 12/1996 |
| JP | 2002-153715 A | 5/2002 |
| WO | 95/13860 A1 | 5/1995 |

* cited by examiner

VACUUM FILTER ASSEMBLY

FIELD OF THE INVENTION

The present invention relates to a vacuum filter assembly, and more particularly, to a crystal growing vacuum filter which mechanically cleans a filter element to remove silicon monoxide from the surfaces of the element.

BACKGROUND OF THE INVENTION

A monocrystalline crystal is a crystalline solid in which the crystal lattice of the entire sample is continuous and unbroken to the edges of the sample, with no grain boundaries. Crystal growing furnaces may be used to grow monocrystalline crystals using the Czochralski (CZ) process. Similarly, multicrystalline crystals may be formed in multicrystalline solidification furnaces. These crystals are usually silicon. The heart of the furnace is the stainless steel chambers where the silicon is melted and the crystal is grown. The crystallization growth process takes place under a vacuum. Typically, Argon is introduced into the top of the chambers to flush out any impurities. Connected to the bottom of the chambers are vacuum lines which draw the purge gas out of the chambers and maintain the desired vacuum level.

During the crystallization process, a quartz crucible is commonly used to hold the silicon inside the furnace. An undesired byproduct of the process is silicon monoxide (SiO) which is formed as some of the oxygen is dissolved out of the quartz crucible at the high temperatures. This SiO has the consistency of a fine powder. SiO is also an unstable substance which will react with oxygen when exposed to air to form silicon dioxide ($SiO_2$). During this reaction, heat is generated.

The vacuum pumps which are used for this application may be one of several types including, piston, liquid ring, or dry pumps. Many of the pumps today also use blowers to increase the pumping speed. During the process, when the SiO travels down the vacuum lines and reaches the vacuum pumps, it can cause damage to dry pumps or blowers which have small clearances between the moving parts. In piston or liquid ring pumps, the SiO will become trapped in the oil, and will force the oil to be changed frequently. Therefore, a filter is almost a necessary component for a crystal growing furnace to remove the SiO.

Currently available on the market are several different filter assemblies. One is a simple pleated paper element in a stainless steel housing. This is a low cost solution, but has the following drawbacks. First, cleaning or replacing the elements is a dirty job because the housing must be opened. Second, the SiO reaction into SiO2 can burn a hole in the paper element if air is introduced quickly. This breach of the element will lead to damage to the vacuum pump.

Another conventional filter assembly is a backpulsing filter unit which uses pleated elements inside a housing. There are usually four pleated elements. Instead of opening the housing to clean the elements, a burst of argon is introduced inside the filter element to flex the element and knock the SiO powder off of the outside of the element. This solution has the following drawbacks: (i) the pleated filter elements are 8-10 inches in diameter, so a filter incorporating four (4) elements will require a large housing approximately 2.5-3 feet in diameter; (ii) a separate tank is required to contain the volume of argon necessary to generate the pressure pulse to clean the elements; (iii) vacuum valves are required on either side of the filter housing so that it can be isolated during cleaning; and (iv) interlocks are required to verify that the vacuum valves are closed before the argon pulse is introduced.

Yet another conventional filter assembly includes a back pulsing unit and a multitude of non-pleated stainless steel filter elements. Rather than using argon as in the conventional filter described above, a burst of room air is introduced inside the filter housing to knock the SiO powder off of the outside of the filter element. First, the filter housing is drawn under a vacuum and the valve on either side of the housing is closed to isolate the housing. Then, a valve at the top of the filter housing is quickly opened to allow air to rush into the housing. The air flow runs across the elements knocking the particulate off of the outer surfaces of the element. This assembly has the following drawbacks: (i) the assembly can be cleaned only after a completed run because the filter housing must be isolated during cleaning; (ii) the use of room air can potentially cause a rapid and undesirable reaction between the oxygen in the air and the SiO particulate; and (iii) the back pulsing is often not forceful enough to completely clean the layer of SiO off of the elements.

It is desired to develop a self cleaning vacuum filter assembly having less components and a smaller filter housing, which will not require such a large space in a user facility.

SUMMARY OF THE INVENTION

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The filter assembly in accordance with the present invention overcomes the problems encountered in the conventional filter assemblies discussed above. Example embodiments of the invention include a filter assembly for mechanically removing silicon monoxide during a crystal growth run comprising a filter housing having an upper portion and a lower portion, a filter mounting plate attached to the filter housing proximate the upper portion, a sweep plate attached to the filter housing proximate the lower portion, a plurality of filter elements attached to the filter mounting plate, and a plurality of ring-shaped brushes mounted to the sweep plate, wherein at least one of the plurality of ring-shaped brushes surrounds each of the plurality of filter elements. The filter housing may have a diameter of about 1-2 feet.

In example embodiments of the invention, the filter assembly may further include a filter top mounted at the upper portion of the filter housing. In example embodiments, the plurality of filter elements includes 12 filter elements and the plurality of ring-shaped brushes includes 12 ring shaped brushes. Each of the plurality of filter elements may be about 2-5 inches in diameter and may be made of stainless steel. For example, each filter element may have a diameter of about 2.375 inches.

In example embodiments, each of the filter elements may be releasably attached to the filter mounting plate with a ring filter lock. Each of the plurality of ring-shaped brushes may include bristles which are made of made of nylon, stainless steel, brass or some other suitable material. Example embodiments of the filter assembly may include an actuator configured to move the sweep plate between the top portion and bottom portion of the filter housing. The actuator may be a pneumatic actuator and the filter assembly may further include inlet and outlet ports to supply air to the actuator.

Other embodiments of the invention include a filter assembly for mechanically removing silicon monoxide during a crystal growth run having a filter housing having a upper portion, a lower portion and a central portion, a filter mounting plate attached to the filter housing proximate the upper portion, a plurality of filter elements attached to the filter mounting plate, and a cylindrical brush mounted in the center portion of the filter housing, wherein the cylindrical brush has a plurality of bristles pointing radially outward, said bristles contacting an outer portion of the plurality of filter elements. In example embodiments, a drive belt is configured to rotate the plurality of filter elements. The drive belt may be powered by a motor or a pneumatic actuator.

Example embodiments of the invention include a filter assembly for mechanically removing silicon monoxide during a crystal growth run including housing means for housing the filter assembly, mounting means for mounting a plurality of filter elements within the housing means, brushing means for mechanically scraping outer surfaces of the plurality of filter elements, and sweep means for sweeping the brushing means along the outer surfaces of the plurality of filter elements.

Alternatively, example embodiments include a filter assembly for mechanically removing silicon monoxide during a crystal growth run including housing means for housing the filter assembly, mounting means for mounting a plurality of filter elements within the housing means, brushing means for mechanically scraping outer surfaces of the plurality of filter elements, and sweep means for rotating the plurality of filter elements such that the outer surfaces contact the brushing means.

Example embodiments of the invention include a method of mechanically removing silicon monoxide from a filter assembly during a crystal growth run including mounting a plurality of filter elements within a housing, mechanically scraping outer surfaces of the plurality of filter elements, and sweeping a plurality of ring-shaped brushes along the outer surfaces of the plurality of filter elements. The method may also include attaching the plurality of ring-shaped brushes to a sweep plate. In this embodiment, sweeping ring-shaped brushes along the outer surfaces of the plurality of filter elements may include operating an actuator which moves the sweep plate such that the plurality of ring-shaped brushes scrapes along a length of the outer surfaces of the plurality of filter elements.

Example embodiments of the invention include a method of mechanically removing silicon monoxide from a filter assembly during a crystal growth run including mounting a plurality of filter elements within a housing, mechanically scraping outer surfaces of the plurality of filter elements, and rotating the plurality of filter elements such that outer surfaces of the plurality of filter elements contacts a cylindrical brush having a plurality of bristles pointing radially outward. The method may also include rotating the plurality of filter elements comprises motorizing a drive belt or a chain attached to the plurality of filter elements.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
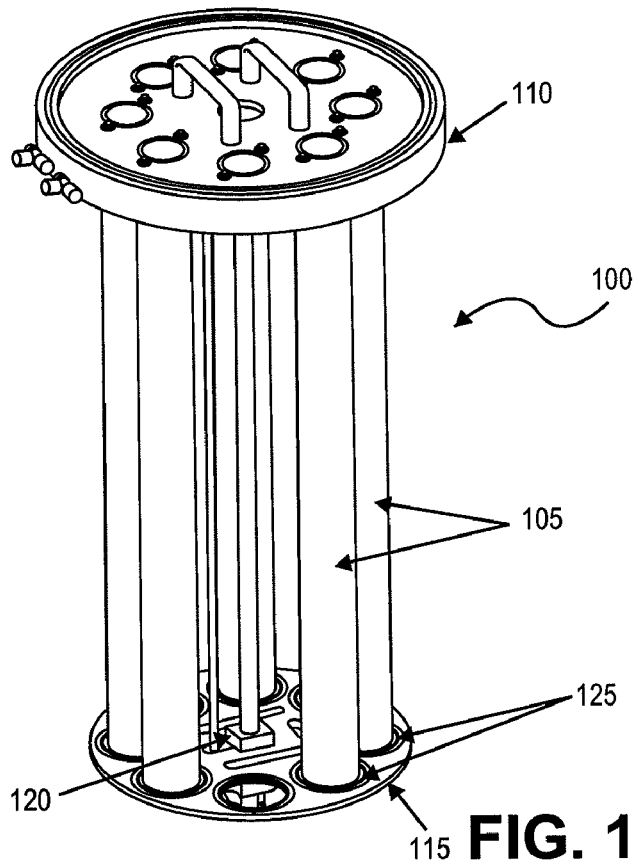
FIG. 1 is a plan view of a vacuum filter assembly, according to an embodiment of the present invention.

Example embodiments of the present invention provide a vacuum filter assembly which mechanically cleans a filter element to remove silicon monoxide from the surfaces of the element during a crystal growth run. Because fewer components are required for this assembly, the cost of producing the filter device may be reduced. Some preferred embodiments will now be described with reference to the drawing figures, in which like reference numbers refer to like parts throughout.

FIG. 1 is a plan view of a vacuum filter assembly 100, according to an embodiment of the present invention. In example embodiments of the invention, vacuum filter assembly 100 includes a plurality of filter elements 105, a filter mounting plate 110, a sweep plate 115, a pneumatic actuator 120 to move the sweep plate 115 and a plurality of ring-shaped brushes 125 mounted to the sweep plate 115. In example embodiments of the invention, the plurality of filter elements 105 are attached to the filter mounting plate 110 at one end. In example embodiments, the plurality of filter elements 105 may be made of stainless steel or some other suitable metal and the filter mounting plate 110 may be made of aluminum, stainless steel or any other suitable material. In some embodiments, there may be 8-12 filter elements 105 in order to provide sufficient surface area so as to not have too large of a pressure differential across the filter. Each of the plurality of filter elements 105 may be approximately 2-5 inches in diameter, for example approximately 2.375 inches in diameter, which enables a smaller filter housing, as discussed further below.

Figure 2:
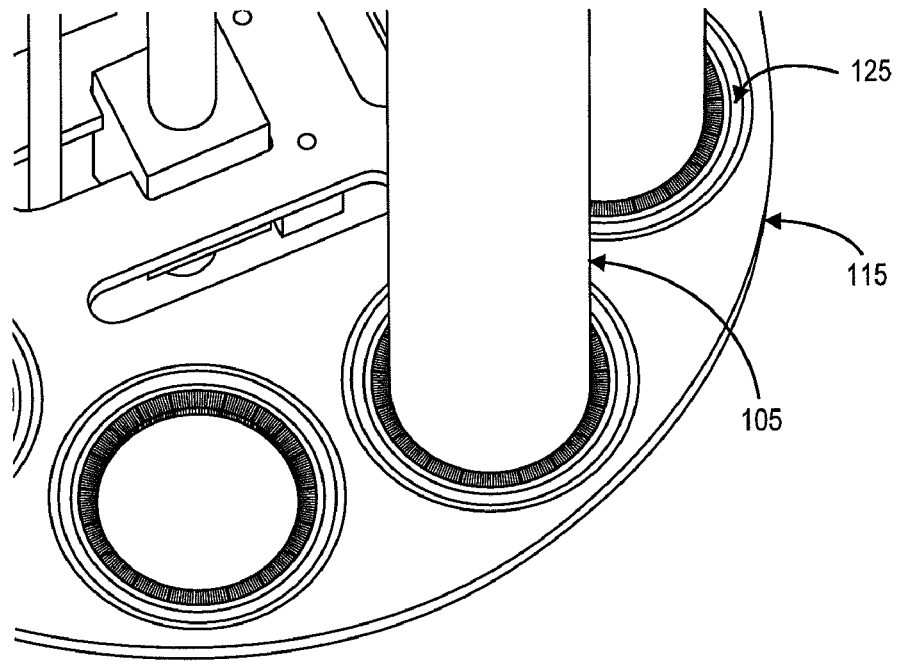
FIG. 2 is a blown up view of a lower portion of the vacuum filter assembly of FIG. 1.

FIG. 2 is a blown up view of a lower portion of the vacuum filter assembly 100 of FIG. 1, showing in detail the sweep plate 115 having the plurality of ring shaped brushes 125. In example embodiments, the sweep plate 115 includes holes for the plurality of filter elements 105, and one of the plurality of ring shaped brushes 125 around each element. In other embodiments, the filter assembly 100 may include 2 or more sweep plates 115 and/or 2 or more ring shaped brushes 125 around each of the plurality of filter elements 105. In example embodiments of the invention, the sweep plate 115 may be made of aluminum, stainless steel or any other suitable material and bristles of the plurality of ring shaped brushes 125 may be made of nylon, brass, stainless steel or any other suitable material.

Figure 3:
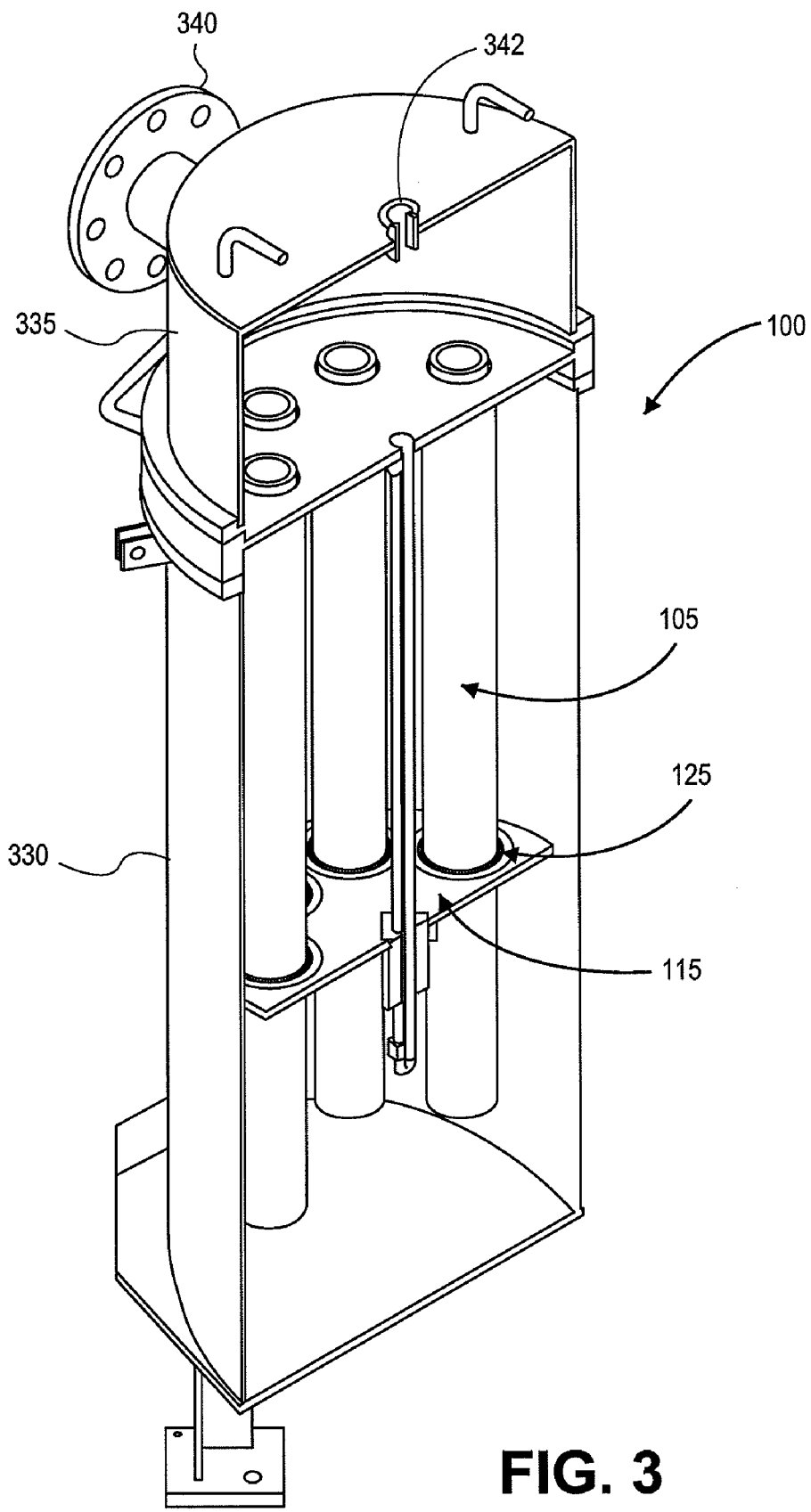
FIG. 3 is a sectional view of the vacuum filter assembly of FIG. 1.

FIG. 3 is a sectional view of the vacuum filter assembly 100 of FIG. 1. In an embodiment of the invention, each of the plurality of ring-shaped brushes 125 may be used to manually clean each of the plurality of filter elements 105. When the surface of each stainless steel filter element 105 is brushed, the SiO powder comes off very easily. When in use, the sweep plate 115 cycles up and down the length of the plurality of filer elements 105 to allow the plurality of ring shaped brushes 125 to clean the outer surfaces of the elements 105. The sweep plate 115 cycles up and down with the help of the actuator 120.

Figure 5:
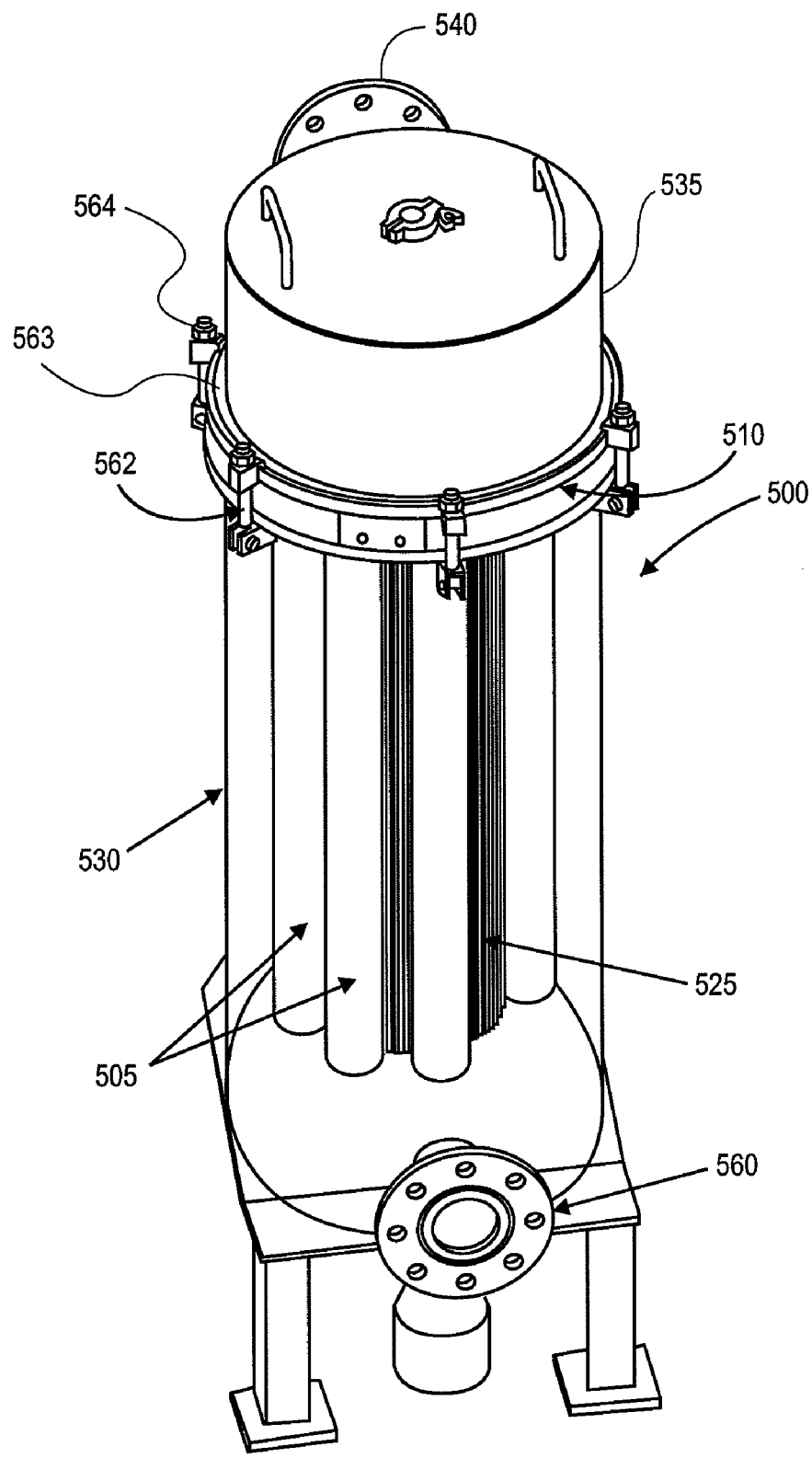
FIG. 5 is a plan view through the outer housing of a vacuum filter assembly, according to an alternate embodiment of the present invention.

As shown in FIG. 3, the filter assembly 100 has a housing 330, a top 335 and an outlet 340 for clean gases to flow out of the assembly 100. In example embodiments, the filter assembly 100 also would include an inlet (as shown in FIG. 5) for dirty gases to flow into the assembly 100. Typically, the filter housing 330 would be operated under vacuum. Because of the smaller filter elements 105, the filter housing may be also smaller than that of the conventional filter assemblies discussed above, which typically had diameters of 2.5 feet or more. The filter housing 330 of the present invention may be 1-2 feet in diameter, for example, the housing 330 may be 1.5 feet in diameter. The top 335 may also include a pressure relief valve port 342, which is used to prevent the filter assembly 100 from becoming overly pressurized. The assembly 100 may also include a pressure gauge (not shown) to enable a user to monitor whether or not the filter housing 100 is under pressure.

Figure 4:
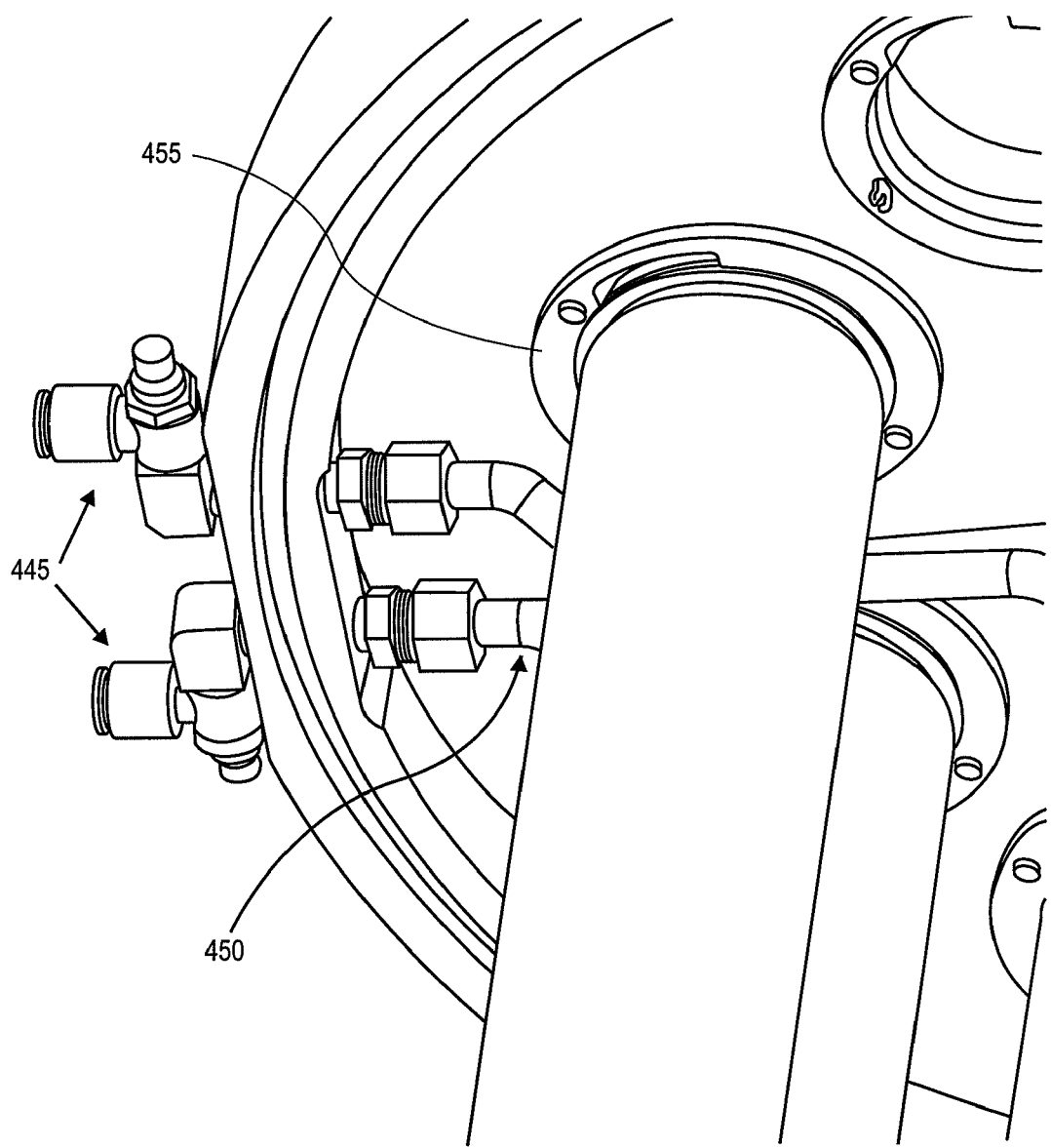
FIG. 4 is a blown up view of the underside of the filter mount plate of the filter assembly of FIG. 1.

FIG. 4 is a blown up view of the underside of the filter mount plate 110 of the filter assembly 100 of FIG. 1. In example embodiments of the invention, air in/out ports 445 may be used to provide air to operate the pneumatic actuator 120. The air supplied to the actuator 120 may travel through tubes 450. In example embodiments of the invention, a ring filter lock 455 may be used to removably fix each of the plurality of filter elements 105 to the filter mount plate 110. Each filter element 105 may be installed by inserting it into the filter mount plate 110, then twisting it to lock its tabs or ears (not shown) between the ring filter lock 455 and the filter mount plate 110.

FIG. 5 is a plan view through an outer housing 530 of a vacuum filter assembly 500, according to an alternate embodiment of the present invention. This filter assembly 500 includes the filter housing 530, a filter top 535, an outlet 540 for clean gases to flow out of the assembly 500 and an inlet 560 for dirty gases to flow into the assembly, a plurality of filter elements 505, a filter mounting plate 510 and a central cylindrical brush 525 in the center of the filter housing 530 having bristles which point radially outward. The top 535 may be attached to the housing 530 using swing bolts 562 which hook over a lip portion labeled 563 of the top 535. In example embodiments, nuts 564 may be used to tighten the swing bolts 562 onto the lip portion 563.

Figure 6:
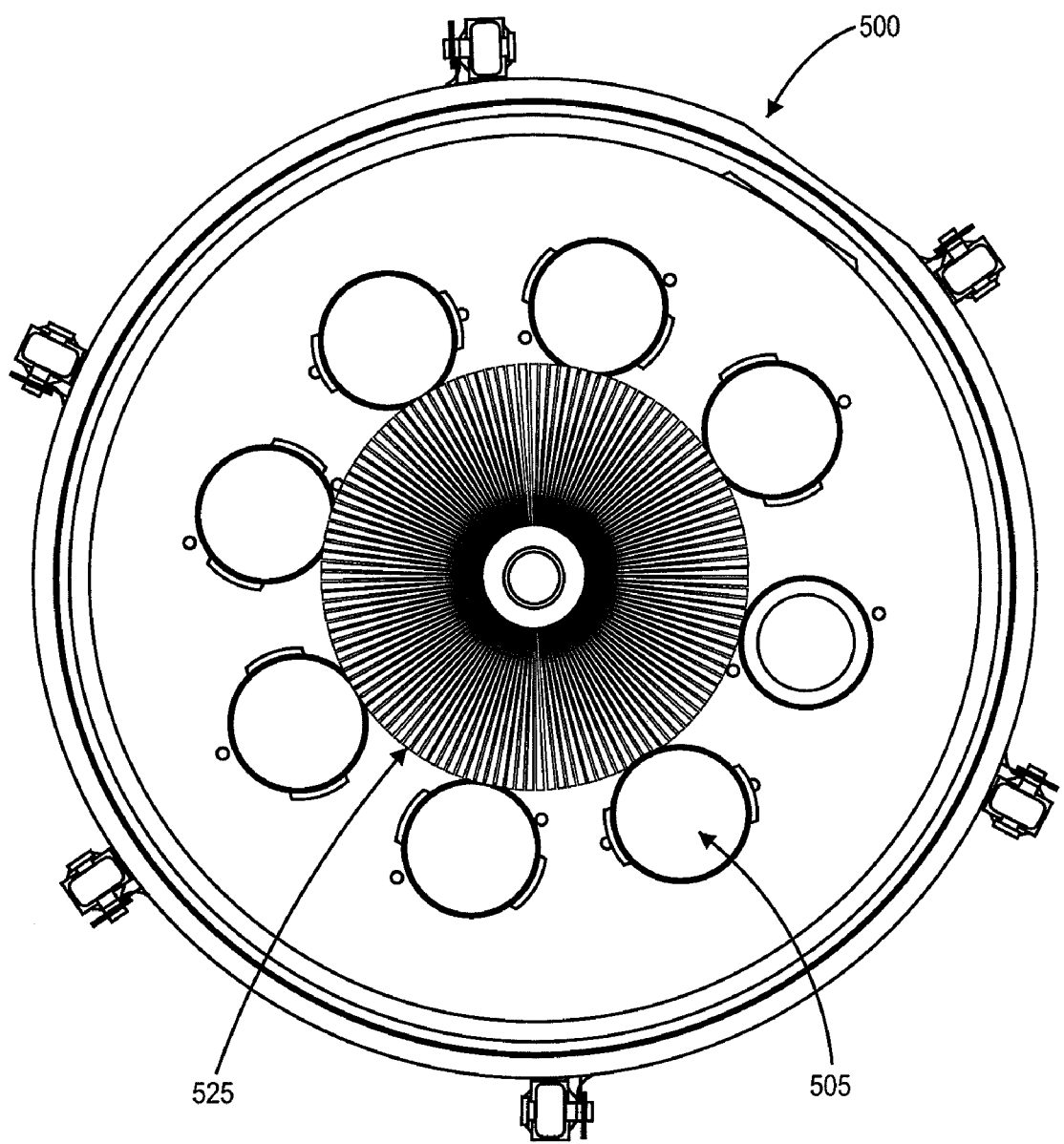
FIG. 6. is a top view of the vacuum filter assembly of FIG. 5.

FIG. 6. is a top view of the vacuum filter assembly 500 of FIG. 5. In this embodiment, the plurality of filter elements 505 are oriented in a circle around the periphery of this central brush 525 such that the brush bristles are in contact with the outer surfaces of the filter elements 505. Each filter element 505 would then be rotated so that the entire outer surfaces of the element 505 is cleaned.

Figure 7:
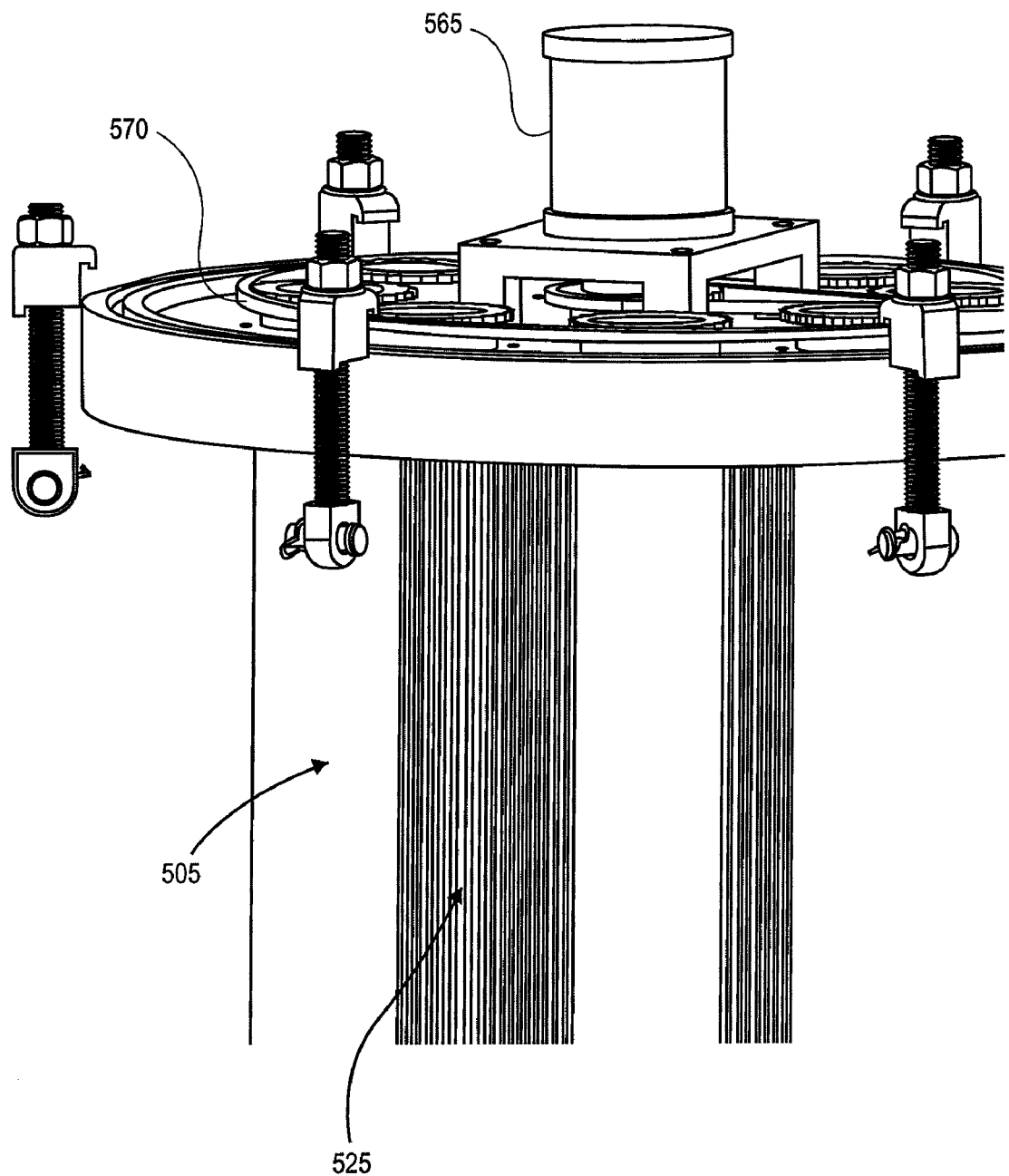
FIG. 7 is a plan view through the outer housing of an upper portion of the vacuum filter assembly of FIG. 5.

FIG. 7 is a plan view through the outer housing 530 of an upper portion of the vacuum filter assembly 500 of FIG. 5. In example embodiments of the invention, the brush 525 cleans the entire outer surfaces of the filter elements 505 as the elements 505 are rotated by an electric motor or pneumatic actuator 565, as shown in FIG. 7. Each of the plurality of filter elements 505 is connected to using a single drive belt or chain 570. As the motor 565 turns, the plurality of filter elements 505 rotate and their outer surfaces are scraped clean by the central brush 525.

Thus, the invention provides a vacuum filter assembly 100, 500 which mechanically cleans a plurality of filter elements to remove silicon monoxide from the outer surfaces of each element. An additional benefit of a vacuum filter assembly in accordance with the present invention is that the elements can be brushed clean during a crystal growth run. Therefore, fewer elements would be required and the cost of the assembly could be reduced.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter assembly for mechanically removing silicon monoxide during a crystal growth run, comprising:
    a filter housing having an upper portion and a lower portion;
    a filter mounting plate attached to the filter housing proximate the upper portion;
    a sweep plate attached to the filter housing proximate the lower portion;
    a plurality of filter elements attached to the filter mounting plate;
    a plurality of ring-shaped brushes mounted to the sweep plate, wherein at least one of the plurality of ring-shaped brushes surrounds each of the plurality of filter elements; and an actuator configured to move the sweep plate between the top portion and bottom portion of the filter housing.

2. The filter assembly of claim 1, further comprising a filter top mounted at the upper portion of the filter housing.

3. The filter assembly of claim 1, wherein the plurality of filter elements includes 12 filter elements and the plurality of ring-shaped brushes includes 12 ring shaped brushes.

4. The filter assembly of claim 1, wherein the actuator is a pneumatic actuator and the filter assembly further includes inlet and outlet ports to supply air to the actuator.

5. The filter assembly of claim 1, wherein the plurality of filter elements is made of stainless steel.

6. The filter assembly of claim 1, wherein each of the plurality of filter elements is releasably attached to the filter mounting plate with a ring filter lock.

7. The filter assembly of claim 1, wherein the filter housing 1-2 feet in diameter.

8. The filter assembly of claim 1, wherein each of the plurality of filter elements is about 2-5 inches in diameter.

9. The filter assembly of claim 8, wherein each of the plurality of filter elements is approximately 2.375 inches in diameter.

10. The filter assembly of claim 1, wherein each of the plurality of ring-shaped brushes includes bristles.

11. The filter assembly of claim 10, wherein the bristles are made of nylon, stainless steel or brass.

12. A filter assembly for mechanically removing silicon monoxide during a crystal growth run, comprising:

a filter housing having a upper portion, a lower portion and a central portion;

a filter mounting plate attached to the filter housing proximate the upper portion;

a plurality of filter elements attached to the filter mounting plate, wherein the filter elements are configured to rotate; and a cylindrical brush mounted in the center portion of the filter housing, wherein the cylindrical brush has a plurality of bristles pointing radially outward, said bristles contacting an outer portion of the plurality of filter elements.

13. The filter assembly of claim 12, further comprising a chain configured to rotate the plurality of filter elements.

14. The filter assembly of claim 12, wherein each of the plurality of filter elements is about 2-5 inches in diameter.

15. The filter assembly of claim 14, wherein each of the plurality of filter elements is approximately 2.375 inches in diameter.

16. The filter assembly of claim 12, further comprising a drive belt configured to rotate the plurality of filter elements.

17. The filter assembly of claim 16, further comprising a motor to power the drive belt.

18. The filter assembly of claim 16, further comprising a pneumatic actuator to power the drive belt.

19. A filter assembly for mechanically removing silicon monoxide during a crystal growth run comprising:

means for housing the filter assembly;

means for mounting a plurality of filter elements within the means for housing;

means for mechanically scraping outer surfaces of the plurality of filter elements;

means for sweeping the means for mechanically scraping along the outer surfaces of the plurality of filter elements;

means for actuating that moves the means for sweeping between a top portion and a bottom portion of the means for housing.

20. A filter assembly for mechanically removing silicon monoxide during a crystal growth run, comprising:

means for housing the filter assembly;

means for mounting a plurality of filter elements within the means for housing;

means for mechanically scraping outer surfaces of the plurality of filter elements;

means for sweeping that rotates the plurality of filter elements such that the outer surfaces contact the means for mechanically scraping; and means for rotating the plurality of filter elements.

21. A method of mechanically removing silicon monoxide from a filter assembly during a crystal growth run, comprising:

mounting a plurality of filter elements within a housing;

sweeping a plurality of ring-shaped brushes along outer surfaces of the plurality of filter elements; and mechanically scraping outer surfaces of the plurality of filter elements by moving the plurality of ring-shaped brushes to scrape along a length of the outer surfaces of the plurality of filter elements.

22. The method of mechanically removing silicon monoxide of claim 21, further comprising attaching the plurality of ring-shaped brushes to a sweep plate.

23. The method of mechanically removing silicon monoxide of claim 22, wherein sweeping ring-shaped brushes along the outer surfaces of the plurality of filter elements includes operating an actuator which moves the sweep plate such that the plurality of ring-shaped brushes scrapes along a length of the outer surfaces of the plurality of filter elements.

24. A method of mechanically removing silicon monoxide from a filter assembly during a crystal growth run comprising:

mounting a plurality of filter elements within a housing;

rotating the plurality of filter elements such that outer surfaces of the plurality of filter elements contacts a cylindrical brush having a plurality of bristles pointing radially outward; and mechanically scraping outer surfaces of the plurality of filter elements.

25. The method of mechanically removing silicon monoxide of claim 24, wherein rotating the plurality of filter elements comprises motorizing a drive belt attached to the plurality of filter elements.

* * * * *